May 5, 1970 J. H. BORNZIN 3,510,160
TWINE-KNIFE

Filed June 24, 1968 4 Sheets-Sheet 1

INVENTOR
JAMES H. BORNZIN
BY Robert L. Graham
ATT'Y.

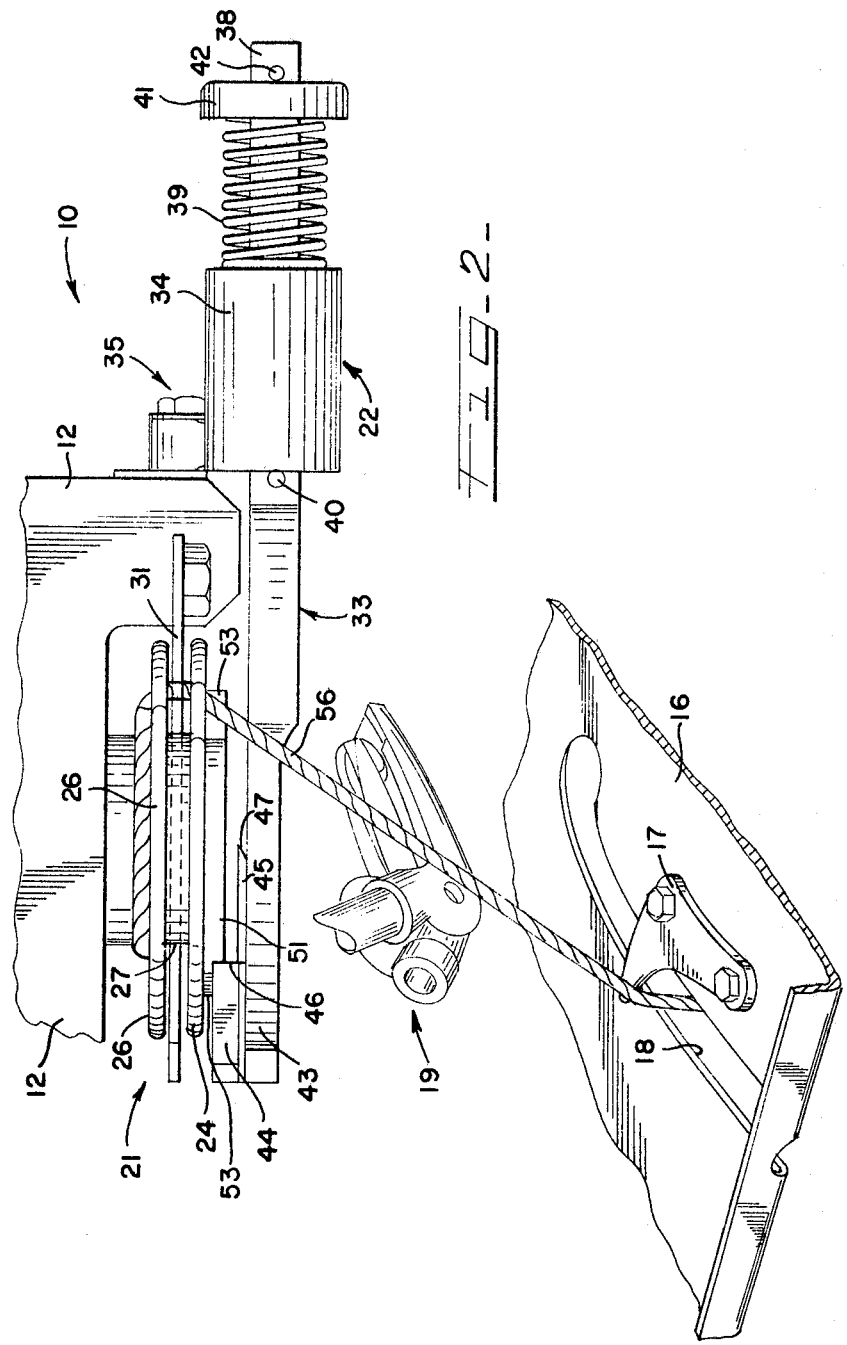

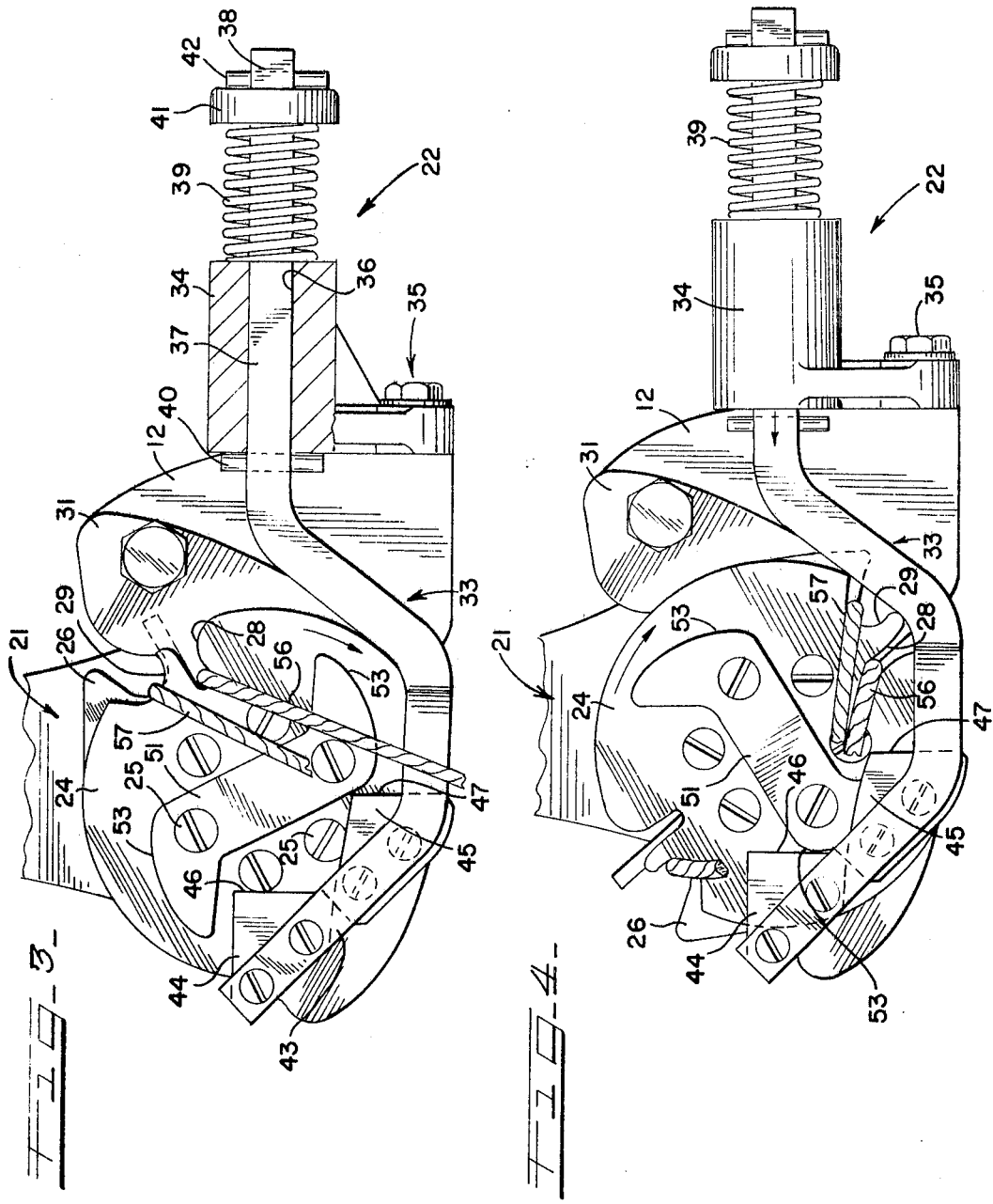

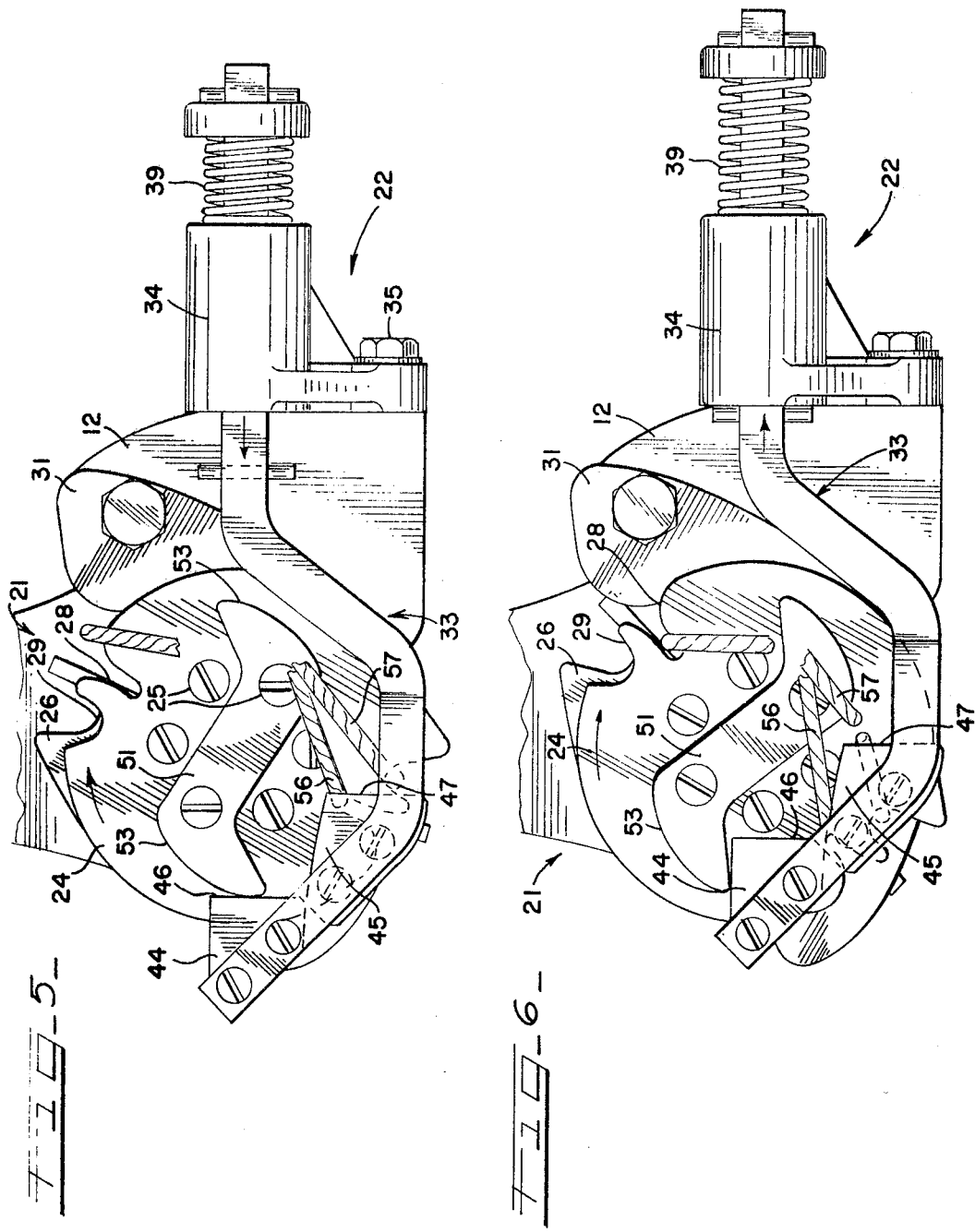

United States Patent Office 3,510,160
Patented May 5, 1970

3,510,160
TWINE-KNIFE
James H. Bornzin, La Grange, Ill., assignor to International Harvester Company, Chicago, Ill., a corporation of Delaware
Filed June 24, 1968, Ser. No. 739,493
Int. Cl. B65h 69/04
U.S. Cl. 289—14                               2 Claims

ABSTRACT OF THE DISCLOSURE

A baler knotter having a rotary hook assembly, a cord holder assembly and a knife assembly, said knife assembly being movable in a cutting stroke to sever twine following completion of the knot.

BACKGROUND AND SUMMARY OF THE INVENTION

The present invention relates generally to baler knotters and more particularly to a knife assembly for use on such knotters.

The function of the baler knotter is to bind hay compressed in the baling machine into a self-sustaining bundle. The knotter includes several components which must be precisely timed or coordinated to satisfactorily tie the strand of twine encircling the compressed material within the time limits inherent in the baling operation. One of the main causes for the knotter to miss or malfunction is the knotter timing which refers to the action of the knife in relation to the other knotter parts. Conventionally, knotters of this type use a stationary knife which requires the cord holder assembly to pull the twine past the blade to effect the cutting action. This arrangement requires the knife to be precisely timed in relation to the cord holder assembly. If due care is given to the timing, the stationary knife arrangement works satisfactorily for a given set of conditions. However as conditions of the twine change and as the knife blade becomes dulled from use, the frequency of knot "misses" increases which necessitates retiming, resharpening the knife, or replacing the blade.

The purpose of the present invention is to provide a baler knotter with a positive acting knife assembly which operates at a determinable time in the tying cycle; the general object being to minimize the effect of the adverse conditions listed above and thereby lend versatility and reliability to the baler knotter.

The present invention contemplates the modification of a conventional knotter to the extent of providing a positive acting knife assembly to sever the twine strand encircling a bale and thereby separate the strand from the twine supply. An oscillating knife holder actuated by a cam mounted on the cord holder assembly operates to cut the twine at a particularly determinable time in the tying cycle. As the cord holder assembly approaches the cord holding position, a spring actuates the knife assembly causing the knife blade to sever the twine. This particular arrangement has an added advantage in that the cord holder assembly moves the twine in a direction opposite that of the knife. Thus the knife assembly and the cord holder assembly impart opposed forces on the twine to effect the cutting action.

DESCRIPTION OF THE DRAWINGS

FIG. 2 is a side elevation of the cord holder and knife assemblies shown at various stages in the tying cycle. the retaining finger diagrammatically illustrated; and FIGS. 3–6 are plan views of the cord holder and knife assemblies shown at various stages in the typing cycle.

DESCRIPTION OF THE PREFERRED EMBODIMENT

Figure 1:
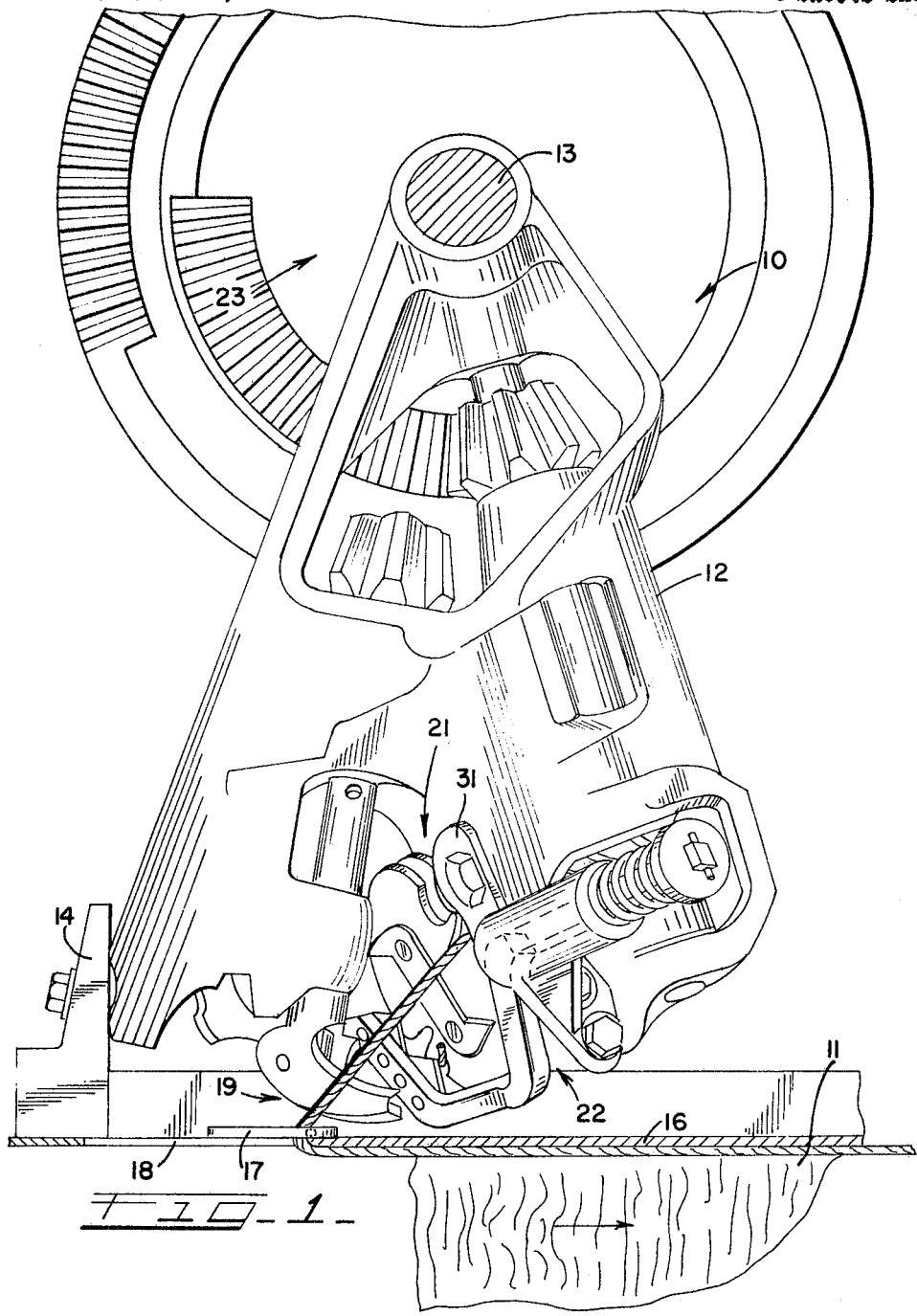
FIG. 1 is a perspective view of a knotter provided with the novel knife assembly of this invention.

In order to appreciate the principles of the present invention it is necessary to understand the operation of the typical twine knotter. With reference to FIG. 1 a convention knotter 10 is shown mounted above the baling chamber 11 of a baler. The knotter frame 12 is journally mounted on a knotter drive shaft 13 and bolted to the baler by means of member 14. Anchor member 14 is a part of the breast plate 16 which underlies the knotter 10 and has formed therein a longitudinal slot 18. The frame 12 supports the various components of the knotter 10 which includes a knotter hook assembly 19, a cord holding assembly 21, and a knife assembly 22. A breast plate finger 17 mounted on the breast plate 16 and extending across the slot 18 cooperates with the cord holder assembly 21 to retain twine during the tying cycle. The knotter components are driven in sequence by means of a conventional intermittent drive assembly shown generally as 23.

As shown in FIG. 2 the cord holder assembly 21 includes a pair of notched discs 24 and 26 separated by a hub 27. The hub 27 and the rear disc 26 are integrally formed and the front disc 24 is secured to the outer face of the hub 27 by a plurality of screws 25 (see FIG. 3). For the purposes of this invention the front and rear discs 24 and 26 may be considered identical, each having pairs of diametric deep and shallow twine carrying notches 28 and 29, respectively.

Interposed between the discs 24 and 26 is a keeper blade 31 which cooperates with the discs to grippingly hold the twine during the bale forming cycle.

At the beginning of the baling operation twine retained in the shallow notch 29 extends around the cord holder assembly 21, through the deep notch 28 and thence around the breast plate finger 17. When the bale is formed in the baling chamber 11 the drive shaft 13 is rotated by conventional means (not shown) actuating the drive means 23 to drive the various knotter parts in the tying cycle. A twine needle (not shown) delivers twine to the cord holder assembly 21 thereby completely encircling the bale in the chamber 11. Next, the hook assembly 19 and the cord holder assembly 21 operating in sequence form a knot in strand end portions as follows: The hook 19 sweeps the pair of strand portions off the breast plate finger 17 while the cord assembly 21 rotates substantially 180° from a strand receiving position to a strand holding position. As the cord assembly 21 approaches the strand holding position, the keeper blade 31 has wedged the twine carried in the shallow notches 29 between the discs 24 and 26, and the hook assembly 19 has returned to its home position, placing the assemblies in position for the final step of the tying cycle—the separation of the needle twine from the twine supply. The hook assembly 19, the cord holder assembly 21, and drive assembly 23 have been described only generally to indicate the environment of the knife assembly 22 which is the subject of this invention.

The knife assembly 22 includes an angulated blade holder 33 reciprocably mounted on the frame 12 by means of a mounting sleeve 34. The mounting sleeve 34 is bolted to the frame 12 as shown at 35 and has a square opening 36 extending longitudinally therethrough. The holder 33 has a straight portion 37 complementarily shaped to fit snugly into the square opening 36 and extends outwardly from the mounting sleeve 34 terminating at end 38. A compression spring 39 and a cap 41 are received on end 38 and held in assembled relation by a pin 42, the spring 39 acting between an end surface of the sleeve 34 and the cap 41. Another pin 40 affixed to the portion 37 is adapted to abut an opposite end surface of the sleeve 34 thereby limiting movement of the holder 33.

From the junction of the pin 40 and the portion 37, the holder 33 extends generally toward the axis of rotation of the cord holder assembly 21 terminating at end portion 43. Mounted on the end portions 43 and placed in side-by-side relation are a cam follower 44 and a knife blade 45. As best seen in FIG. 2, the cam follower 44 having a thickness greater than the blade 45 is positioned in close proximity to the front disc 24, but all three members, e.g. the front disc 24, the cam follower 44, and the knife blade, lie in parallel planes. The cam follower 44 is shaped to provide a profiled surface 46 adapted to cooperate with a cam 51 mounted on disc 24, described in detail below. The blade 45 has a tapered edge 47 disposed generally perpendicular to the longitudinal axis of the straight portion 37.

The cam 51, mounted on the front disc 24 by the set screws 25, provides the means for imparting oscillatory motion to the holder 33, and hence the blade 45. The cam 51, has a pair of cam surfaces 53, 53 arranged to engage the profile surface 46 of the follower 44 and thereby move the holder 33 to a cocked position against the bias of spring 39.

As the cord holder assembly 21 is rotated 180° from the twine receiving position (FIG. 3) to the twine holding position (FIG. 6) the cam 51 engages the follower 44 forcing the holder 33 outwardly against the bias of spring 39 (see FIG. 5). As the cord holder assembly 21 approaches the strand holding position, the knife assembly 22 reaches the cocked position. The final incremental movement of the cord holder assembly 21 carries the cam 51 clear of the follower 44 whereupon the force of spring 39 snaps the holder 33 back to its normal position, moving the blade 45 through a cutting stroke. It should be noted that because of the step-like action of the cord holder assembly 21, the diametrically situated cam surfaces 53, 53 act upon the follower 44 in alternate tying cycles.

The operation of the knife assembly 22 will be described with reference to the FIGS. 2 to 6. Beginning with FIG. 2, the cord holder and knife assemblies 21 and 22 are in their respective home positions. In this position, a twine portion 56 passing through the deep notch 28 extends adjacent the knotter hook assembly 19 around the breast plate finger 17 and thence around three sides of the bale being formed in the baling chamber 11. When the bale is completed the twine carrying needle delivers a twine portion 57 to the knotter assembly 21 laying it in the shallow notch 29 (FIG. 3). As the needle approaches its highest position the cord holder assembly 21 begins turning clockwise as viewed in FIG. 4. At the same time the operation of the knotter hook assembly 19 sweeps the strands 56 and 57 off the breast plate finger 17 (see FIG. 2) and joins the strands 56 and 57 in a knot in a manner well known in the art. Now as shown in FIG. 4, rotation of the cord holder 21 brings the cam surface 53 of cam 51 into engagement with the profiled surface 46 of follower 44. Referring next to FIG. 5, continued movement of the holder assembly 21 causes the cam 51 to force the holder 33 outwardly to the cocked position compressing the compression spring 39. Meanwhile as the holder 33 is moved out, the action of the keeper blade 31 wedges strand 57 between the front and rear discs 24 and 26 gaining a secure hold thereon.

Next, the cord holder assembly 21 in the final increment of angular movement to its holding position, carries the cam 51 past the follower 44 allowing the spring 39 to snap the knife blade 45 through the cutting stroke. Just prior to the snapping action of the knife blade 45 the knotter hook assembly 19 has completed the knot and the only part of the tying cycle remaining is the severance of the portion 57 from the needle supply. In snapping back to its home position the knife assembly 22 causes the blade 45 to pass in the path of the oncoming strand 57 carried by the cord holder assembly 21. It should be emphasized that the cutting action is effected by the counter-moving parts—the blade 45 moves toward the twine and the twine toward the blade 45. Now with the twine portion 57 cut and portion 56 released, the bound bale is forced rearwardly stripping the knot and ends from the knotter hook assembly 19.

Thus, as has been demonstrated, the knife blade 45 acting at a time determinable in the tying cycle applies a positive cutting force to the needle twine severing the twine from the twine supply.

What is claimed is:
1. In combination with a rotary cord holder assembly, a mechanism for severing twine held by said cord holder assembly, and comprising:
   a knife assembly including a blade holder movable relative to said cord holder assembly, said holder having a profiled surface formed therein, and a blade mounted on said blade holder and positioned adjacent said cord holder assembly;
   a cam carried by said cord holder assembly and cooperable with said profiled surface for causing said blade to move through a cutting stroke in response to rotation of said cord holder assembly; and
   means for biasing said holder in a home position, said cam being operative to first move said blade holder to a cocked position removed from said home position and then to release said blade holder whereby said biasing means drives said blade holder in said cutting stroke.
2. In combination with a twine knotter having a frame and a rotary cord holder assembly on said frame, a mechanism for severing twine held by said cord holder assembly, said mechanism comprising:
   a blade holder reciprocably mounted on said frame and having a cutting blade mounted thereon adjacent to said cord holder assembly;
   cam means rotatable with said cord holder assembly, a follower on said blade holder engageable by said cam means to move said blade holder to cocked position; and
   resilient means for moving said blade holder in a cutting stroke in response to disengagement of said cam means and said follower to release said blade holder from its cocked position.

References Cited
UNITED STATES PATENTS

| 285,330 | 9/1883 | Wilkes | 289—14 |
| 407,734 | 7/1889 | Kunkle | 289—14 |

LOUIS K. RIMRODT, Primary Examiner